March 4, 1924.

E. S. EVANS 1,485,971

COMBINED BUCK AND HOLDDOWN

Filed May 24, 1923

Inventor
Edward S. Evans

By F. H. Bryant,
Attorney

Patented Mar. 4, 1924.

1,485,971

UNITED STATES PATENT OFFICE.

EDWARD S. EVANS, OF DETROIT, MICHIGAN, ASSIGNOR TO E. S. EVANS & CO., INC., OF DETROIT, MICHIGAN, A CORPORATION OF DELAWARE.

COMBINED BUCK AND HOLDDOWN.

Application filed May 24, 1923. Serial No. 641,187.

*To all whom it may concern:*

Be it known that I, EDWARD S. EVANS, a citizen of the United States of America, residing at Detroit, in the county of Wayne and State of Michigan, have invented certain new and useful Improvements in Combined Bucks and Holddowns, of which the following is a specification.

This invention relates to a combined buck and holddown and has for its primary object to provide an automatically adjustable holddown associated with a buck and the hub of an automobile wheel for retaining the latter against upwardly shifting movement.

A further object of the invention is to provide a combined buck and holddown, interlocking ratchet connection being established between the holddown and buck permitting downward movement of the holddown relative to the buck, but preventing upward movement of the holddown, this operation compensating for the deflation of pneumatic tires during transportation of an automobile with the automobile rigidly supported when the tires are either inflated or deflated.

With the above and other objects in view as the nature of the invention is better understood, the same consists of the novel form, combination and arrangement of parts hereinafter more fully described, shown in the accompanying drawing and claimed.

Figure 1:
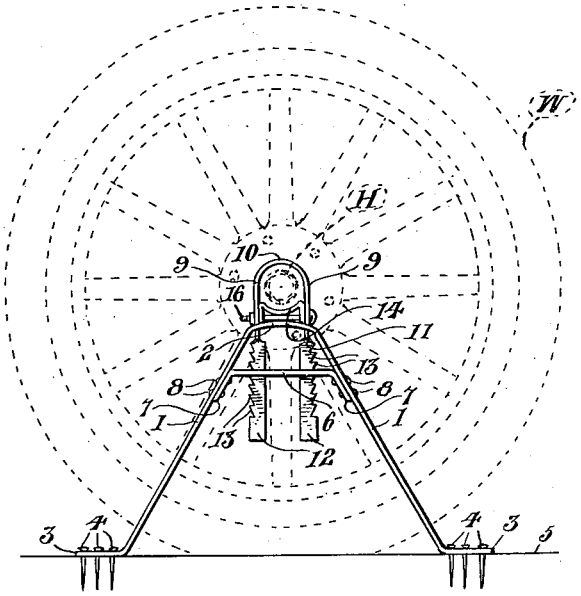
Figure 2:
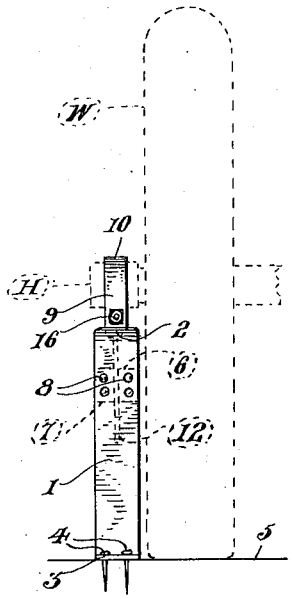
Figure 3:
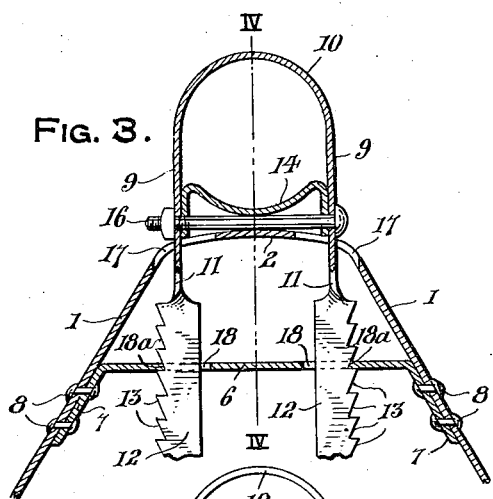
Figure 4:
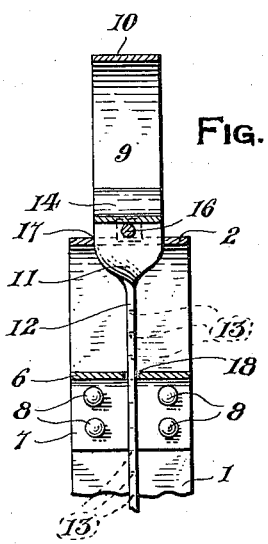
Figure 5:
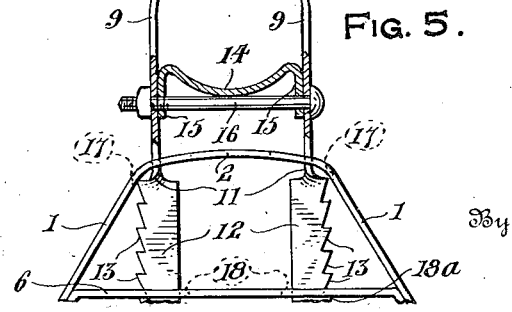

In the drawing, wherein like reference characters designate corresponding parts throughout the several views, Figure 1 is a side elevational view of a combined buck and holddown constructed in accordance with the present invention, an automobile wheel illustrated by dotted lines being shown operatively positioned with the pneumatic tire deflated and the holddown interlocked with the buck at its limit of downward movement with the wheel rigidly supported, Figure 2 is an edge elevational view of the device with an automobile wheel illustrated by dotted lines, Figure 3 is an enlarged fragmentary longitudinal sectional view of the upper end of the buck and holddown showing the holddown at its limit of downward movement relative to the buck and illustrating the interlocking connection between the holddown and buck, Figure 4 is a vertical cross-sectional view taken on line IV—IV of Fig. 3, and Figure 5 is a fragmentary side elevational view, partly in section showing the holddown in its elevated position relative to the buck.

In the shipment of automobiles where the ends of the axles or wheel hubs are supported on loading bucks, and holddowns are associated with the axles or hubs and the bucks, the automobiles when prepared for shipment usually have the pneumatic tires thereof inflated to full capacity, and when air escapes from the pneumatic tires, considerable looseness or play of the associated parts will be present destroying the rigid mounting of the automobile and permitting vertically shifting movement of the automobile. It is therefore the primary object of this invention to provide a combined buck and holddown that is automatic in its operation to compensate for the loss or escape of air from the pneumatic tires, the automobile being rigidly supported when the pneumatic tires are in a fully inflated condition, and likewise supported when partially or wholly deflated. These objects are accomplished by providing an interlocking or ratchet connection between the holddown and buck, ratchet legs carried by the holddown cooperating with a yoke or cross brace carried by the buck and adapted to be automatically lowered for proper engagement with the yoke or cross brace when the tire is deflated.

Referring more in detail to the accompanying drawing wherein there is illustrated the preferred embodiment of the invention, the buck embodies a pair of upwardly converging side legs 1 connected at their upper ends by a cross head 2 while angularly disposed feet 3 are formed at the lower ends of the legs to be anchored as at 4 to a car floor 5 or similar support. The buck illustrated herein is shown as being constructed of metal, but it is to be understood that other material may be employed, such as wooden legs and a head of the desired material and configuration. A cross yoke or brace 6 extends between the legs 1 adjacent the upper ends thereof, the ends of the cross brace 6 being angularly bent as at 7 for flat engagement with the inner faces of the legs and anchored thereto as at 8.

The holddown is in the form of a strap bent into inverted U-formation including side legs 9 connected at their upper ends by a loop 10, the legs 9 being twisted as at 11 intermediate the ends thereof to provide lower extensions 12, the major transverse axes of which extend at right angles to the similar axes of the legs 9 as clearly illustrated. Downwardly operating ratchet teeth 13 are formed on the outer edges of the leg extensions 12 and extend over the major length thereof.

A concaved cuff 14 having depending end legs 15 is positioned between the holddown legs 9 as shown in Figs. 3 and 5 and is anchored therein by the cross bolt 16 extending through the holddown strap 9 and the cuff legs 15 and is positioned a sufficient distance from the upper loop 10 of the holddown to accommodate the hub H of an automobile wheel W.

To facilitate mounting of the holddown in operative position with the buck, the head 2 of the buck is provided with a pair of relatively large spaced openings 17 permitting passage of the legs 9 and twisted leg extensions 12 of the holddown, the cross brace 6 being provided with a pair of slotted openings 18 through which the leg extensions 12 extend, the slotted openings 18 being of a length to permit free sliding movement therethrough of the leg extensions while the outer end walls 18ᵃ of the slots 18 are designed for cooperation with the ratchet teeth 13, the side legs 9 and leg extensions 12 of the holddown being of a resilient nature to cause the same to be separated or sprung outwardly with the ratchet teeth 13 engaging the walls 18ᵃ of the slotted openings 18 as shown in Fig. 3.

When an automobile is mounted for shipment, the tires thereof are usually inflated to their full capacity and engage the floor 5 of the car, the hub H of the wheel W resting in the cuff 14 carried by the holddown while the ratchet teeth 13 engaging the end walls 18ᵃ of the slotted openings prevent upward movement of the holddown and automobile, the holddown initially assuming the position illustrated in Fig. 5 with the cuff 14 and connecting bolt 16 spaced above the head 2 of the buck. Should the pneumatic tires becomes partially or wholly deflated, the weight of the automobile upon the cuff 14 of the holddown, will cause the latter to be lowered through the buck with the ratchet teeth 13 upon the holddown leg extensions 12 ratcheting over the end walls 18ᵃ of the slotted openings 18 and subsequently sprung outwardly for automatically holding the holddown in its lowered position and against upward movement. The holddown is entirely automatic in its operation, and when the pneumatic tires of the automobile are deflated, the automobile still remains rigidly supported upon the buck and is effectively retained against vertically shifting movement.

While there is herein shown and described the preferred embodiment of the present invention, it is nevertheless to be understood that minor changes may be made therein without departing from the spirit and scope of the invention as claimed.

What is claimed as new is:—

1. In a combined buck and holddown, a buck, and a holddown slidably and interlockingly associated therewith.

2. In a combined buck and holddown, a buck, and an inverted U-shaped holddown slidably and interlockingly associated therewith.

3. In a combined buck and holddown, a buck, and a holddown slidably and interlockingly associated with the buck adapted for supporting an automobile, the holddown being shifted downwardly upon deflation of the automobile tires and prevented from upward movement by the interlocking connection between the holddown and buck.

4. In a combined buck and holddown, a buck, a holddown slidably and interlockingly associated therewith and constructed to support the hub of an automobile wheel or the axle above the buck and adapted to be lowered into the buck upon deflation of the automobile tires and retained against upward movement of the interlocking engagement between the buck and holddown.

5. In a combined buck and holddown, a buck, and a holddown having downwardly ratcheting side legs interlockingly engaging the buck and preventing upward movement thereof.

6. In a combined buck and holddown, a buck, and a holddown having downwardly ratcheting resilient side legs interlockingly engaging the buck and preventing upward movement thereof.

7. In a combined buck and holddown, a buck, a holddown of inverted U-shape having depending side legs twisted intermediate their ends to provide feet extensions having ratchet teeth on the outer edge, and said buck including a slotted cross-brace through which the feet extend with the ratchet teeth cooperating with the outer end walls of the slots.

8. In a combined buck and holddown, a buck, a holddown of inverted U-shape having depending resilient side legs twisted intermediate their ends to provide feet extensions having ratchet teeth on the outer edge, and said buck including a slotted cross-brace through which the feet extend with the ratchet teeth cooperating with the outer end walls of the slots.

9. In a combined buck and holddown, a buck, a holddown of inverted U-shape having depending side legs twisted intermediate their ends to provide feet extensions having ratchet teeth on the outer edge, a wheel hub supporting collar secured between the side legs of the holddown above the buck, and said buck including a slotted cross-brace through which the feet extend with the ratchet teeth cooperating with the outer end walls of the slots.

10. In a combined buck and holddown, a buck, a holddown of inverted U-shape having depending resilient side legs twisted intermediate their ends to provide feet extensions having ratchet teeth on the outer edge, a wheel hub supporting collar secured between the side legs of the holddown above the buck, and said buck including a slotted cross-brace through which the feet extend with the ratchet teeth cooperating with the outer end walls of the slots.

11. In a combined buck and holddown, a buck, a holddown of inverted U-shape having depending side legs twisted intermediate their ends to provide feet extensions having ratchet teeth on the outer edge, said buck including a slotted cross-brace through which the feet extend with the ratchet teeth cooperating with the outer end walls of the slots, and means carried by the holddown above the buck and to be engaged by a part of an automobile to lower the holddown in the buck with the ratchet teeth on the legs ratcheting over the end walls of the brace slots and retained against upward movement.

In testimony whereof I affix my signature.

EDWARD S. EVANS.